(12) United States Patent
Forstrom et al.

(10) Patent No.: US 7,260,722 B2
(45) Date of Patent: Aug. 21, 2007

(54) DIGITAL MULTIMEDIA WATERMARKING FOR SOURCE IDENTIFICATION

(75) Inventors: Howard Scott Forstrom, North Haledon, NJ (US); Edward Wojciechowski, Bloomingdale, NJ (US); Madhav Shridhar Phadke, Colts Neck, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 894 days.

(21) Appl. No.: 10/028,727

(22) Filed: Dec. 28, 2001

(65) Prior Publication Data

US 2003/0123659 A1   Jul. 3, 2003

(51) Int. Cl.
*H04L 9/00* (2006.01)
*H04N 7/167* (2006.01)

(52) U.S. Cl. .................. 713/176; 380/202; 713/160
(58) Field of Classification Search ............... 713/176, 713/161, 200; 380/202, 269, 205
See application file for complete search history.

(56) References Cited

U.S. PATENT DOCUMENTS

| | | | |
|---|---|---|---|
| 353,666 A | 12/1886 | Crane, Jr. | |
| 5,826,227 A * | 10/1998 | Jayant | 704/229 |
| 5,862,260 A | 1/1999 | Rhoads | |
| 5,915,027 A | 6/1999 | Cox et al. | |
| 5,930,369 A * | 7/1999 | Cox et al. | 380/54 |
| 5,940,134 A | 8/1999 | Wirtz | |
| 6,031,914 A * | 2/2000 | Tewfik et al. | 380/54 |
| 6,145,081 A | 11/2000 | Winograd et al. | |
| 6,731,776 B1 * | 5/2004 | Fujiwara | 382/100 |
| 2001/0044899 A1 * | 11/2001 | Levy | 713/176 |
| 2001/0054150 A1 * | 12/2001 | Levy | 713/176 |

FOREIGN PATENT DOCUMENTS

| | | | |
|---|---|---|---|
| EP | 1098522 A1 * | 5/2001 | |
| EP | 1326422 A2 | 7/2003 | |
| JP | 2001052072 | 2/2001 | |
| JP | 2001052072 A * | 2/2001 | |
| WO | 9748212 A | 12/1997 | |
| WO | WO9748212 A1 * | 12/1997 | |
| WO | WO99/63443 | 12/1999 | |

OTHER PUBLICATIONS

Negotiate (defined), Dictionary.com retrieved online <URL:http://dictionary.reference.com/search?q=negotiate>, pp. 1-2.*

(Continued)

*Primary Examiner*—Kambiz Zand
*Assistant Examiner*—Thomas Szymanski
(74) *Attorney, Agent, or Firm*—Edell, Shapiro & Finnan, LLC

(57) ABSTRACT

A system and method for communicating a device's capabilities uses a digital watermark embedded in content data. The watermark includes parameters concerning a source unit's communications capabilities. The watermark is embedded within content data, such as multimedia data, of a data packet. A destination unit, upon receiving the data packet detects if a watermark is present, and if so extracts the source's capability parameters from the watermark. The destination unit then negotiates with the source unit to use certain capabilities based on the source capability information contained in the watermark.

29 Claims, 7 Drawing Sheets

OTHER PUBLICATIONS

Transport Layer Security, Wikipedia.org, Jan. 1999 <URL:http://en.wikipedia.org/w/index.php?title=Transport_Layer_Security&printable=yes> retrieved online Jul. 24, 2006.*

Dierks et al, The TLS Protocol rfc 2246, Jan. 1999, <URL:http://tools.ietf.org/html/2246> retrieved online Jul. 24, 2006.*

Internet Protocol Suite, Wikipedia.org, <URL:http://en.wikipedia.org/w/index.php?title=Internet_protocol_suite&printable=yes>retrieved online Jul. 24, 2006.*

Negotiate (defined), Dictionary.com retrieved online on Apr. 26, 2006 <URL:http://dictionary.reference.com/search?q=negotiate>, pp. 1-2.*

European Search Report dated Mar. 5, 2004.

Cox et al., *Secure Spread Spectrum Watermarking for Multimedia*, NEC Research Institute, Technical Report 95-10, pp. 1-33, 1997.

Cox et al., *Watermarking as communications with side information*, Proceedings of the IEEE, 87, 7, 1127-1141, (pp. 1-26), 1999.

Miller et al., *A review of watermarking principles and practices*, Digital Signal Processing in Multimedia Systems, Ed. K.K. Parhi and T. Nishitani, Marcell Dekker Inc., 461-485, (pp. 1-32), 1999.

* cited by examiner

DIGITAL MULTIMEDIA WATERMARKING FOR SOURCE IDENTIFICATION

BACKGROUND OF THE INVENTION

1. Field of the Invention

The invention relates to communicating information using digital watermarks.

2. Description of the Related Art

The technique of marking paper with a watermark for identification is as almost as old as papermaking itself. With the advent of digital media there are many techniques for applying this ancient art to our new technologies. Such a watermark, applied to digital media, is referred to as a digital watermark. A digital watermark is described by M. Miller et al., *A Review of Watermarking Principles and Practices*, in *Digital Signal Processing in Multimedia Systems*, 18, 461-85 (K. K. Parhi and T. Nishitani, Marcell Dekker, Inc., 1999), as a piece of information that is hidden directly in media content, in such a way that it is imperceptible to a human observer, but easily detected by a computer.

Although the applications of using digital watermarks differ from the applications of using paper watermarks, the underlying purpose and approach remain the same. The conventional purpose of using a digital watermark is to identify the original document, identify a legitimate document or prohibit unauthorized duplication. The approach used in applying a digital watermark is much the same as in watermarking of paper. Instead of using mesh to produce a faint indentation in the paper providing a unique identifiable mark, a digital pattern is placed into an unused area or unnoticeable area of the image, audio file or file header. Digital watermarks have also been used to send information concerning the message in which the watermark is embedded, including information for suppressing errors in signal transmission and calibration information. These conventional uses of watermarks, however, fail to fully integrate an intelligent watermark capable of supplying information along with the original signal, image or packet of data.

More specifically, prior digital watermarking techniques suffer from the shortcoming of relying on source identification being tied into the network transport protocol. Conventional source identification and authentication schemes use a source identification field embedded in a packet header by the network or transport layer for ascertaining source origin and authentication. Since network and transport layer headers get stripped off of a packet by those layers, these schemes limit identification and authentication to being performed by the data transport or network protocols.

Current fallback schemes to support the capabilities of, and to be compatible with, preexisting and deployed equipment, referred to here as legacy equipment, also inhibit the growth and deployment of new and advanced features in multimedia voice, video and data equipment. For example, in the military radio environment LPC-10e vocoders (voice operated recorder), which use linear prediction compression (LPC), have been in use for years and are widely deployed. However, performance of the LPC-10e vocoder is inadequate in severely degraded background noise environments. Newer technologies, such as in the Federal Standard MELP (mixed excitement linear processing) vocoder, have significantly reduced background noise effects. The capabilities of such newer technologies often go unused because currently deployed fallback mechanisms default to the lowest common denominator capabilities of the communicating devices. That is, these fallback schemes reduce the operating capability of the deployed equipment to the lowest capability level of the devices in communication (e.g. to the capabilities of the legacy LPC_10e vocoder). Accordingly, the advanced capabilities of new equipment goes underutilized until all legacy equipment in a network is upgraded.

Even after the legacy equipment leaves the network, the voice data streams present in the network and that were generated to be compatible with the LPC-10e vocoders remain in the legacy LPC-10e waveform even though such a waveform is not required for operation once the legacy equipment is removed from the communication network. This is due to the fact that the newer radios are not capable of discriminating new equipment sources from legacy equipment sources purely from the transport layer information in the transmitted data stream. This prevents the new equipment from automatically negotiating capabilities with other devices to operate with the greatest capabilities common to the communicating devices.

SUMMARY OF THE INVENTION

Therefore, in light of the above, and for other reasons that will become apparent when the invention is fully described, an aspect of the invention is to automatically negotiate communication parameters between communicating devices based on the capabilities of those devices. This can be accomplished by including capability information in a digital watermark embedded in an information field of a message transported between the communicating devices.

A further aspect of the invention enables a device in a communication network to negotiate a common set of communication capabilities for devices in the network to use, without relying on information contained in a packet header.

Yet another aspect of the invention generates a digital watermark including information concerning a device's capabilities.

A still further aspect of the invention detects a digital watermark in an information field of a data received from a source unit, extract from a watermark in the packet information concerning the source units capabilities.

The aforesaid objects are achieved individually and in combination, and it is not intended that the invention be construed as requiring two or more of the objects to be combined unless expressly required by the claims attached hereto.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Figure 1:
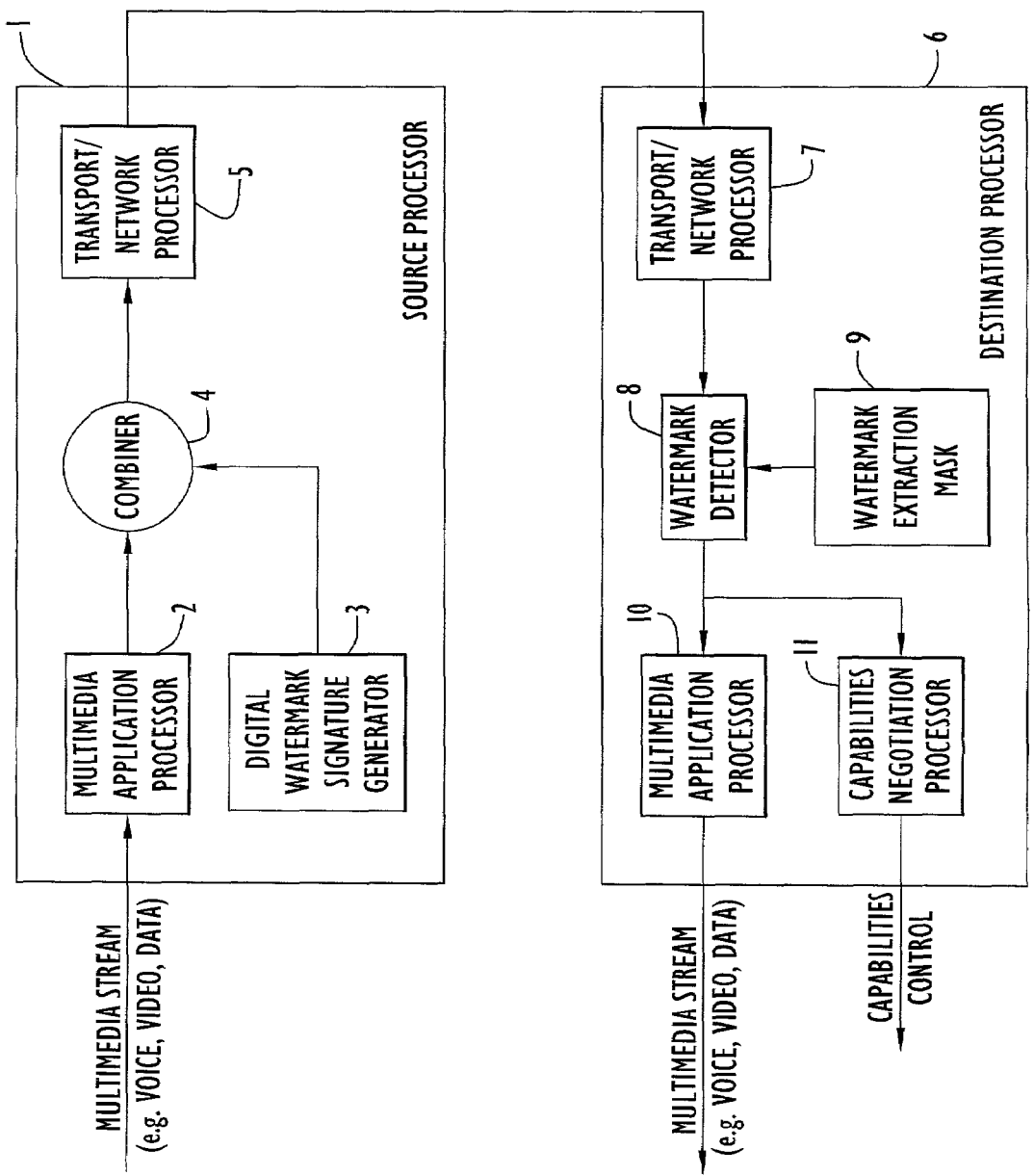
FIG. 1 is a block diagram of a communication system using a digital watermark to convey information concerning a source processor's capabilities.

The invention is described below with reference to the above drawings, in which like reference numerals designate like components.

Overview

The invention uses a signature structure, such as a watermark, that provides control information content embedded in application information, rather than a passive watermark that provides only identification information. This technique also recognizes the need to be able to tailor the information content to customize an application at either a source or a destination.

A signature, containing information concerning attributes of a source unit is periodically embedded at pseudo-random points in a transmitted data stream allowing the source to watermark a signal, such as a multimedia signal. Using such a signature to watermark the data stream allows a device at the data stream's destination to identify and authenticate the source's capabilities. The watermark can contain, for example, source capability content, including a source ID, operational modes and capabilities of the source and application specific performance parameters.

The watermark can be inserted after application layer multimedia processing has been performed, but prior to the network and transport layer processing. Accordingly, the watermark is embedded within the multimedia signal prior to network and transport layer headers being applied to packets of the data stream. This allows the watermark to be applied to the data stream without effecting either application-level or transport-level processing of the digital multimedia data stream.

A signature is a group of bits that indicate a specific attribute of the source unit, such as a capability that the source unit possesses or lacks. The type of information that can be used as a signature includes any source-specific attribute. For example, in a wireless communications system, one or more signatures can indicate the audio and video compression capabilities, the application software or operating system revision numbers, the ID number of the source, the audio handset capabilities including the number of bits and audio fidelity of the source. The signature can be applied as a short duration digital signal, and can be placed as a watermark in non-critical points in the data stream, such that its effects on the resulting reconstructed multimedia stream are imperceptible to the human. For instance, a signature that indicates a source unit's capabilities can be placed in the watermark.

In an audio application, the signature appears as a short duration pattern placed at non-critical bits in the compressed audio signal. The non-critical bits can be predetermined so that the source and destination units both know a priori which bits in the signal are the non-critical bits with which the watermark is embedded in the signal. For example, for the MELP vocoder, the non-critical bits can include the least significant bits of the Multi-stage Vector Quantization of LPC coefficients, the Jitter Index bit, the least significant bits of the Second Gain Index, and the least significant bits of the Fourier Magnitude, as well as spare or unused bits. For LPC-10e, the non-critical bits can include the least significant bits of the reflection coefficients.

In a video application the signature appears in randomly placed pixel locations in either a still image or a full-motion video stream. For example, in a video code conforming to the H.263 standard, the watermark can be placed in the least significant bits of the unrestricted motion vectors and the Discrete Cosine Transform (DCT) coefficients. In still image encoding, such as in a JPEG image, the non-critical bits can include the least significant bits of the quantized DCT coefficients.

The destination equipment detects the watermarked signature and ascertains the source's capabilities based on the information contained in the watermark. This allows the destination equipment to negotiate to higher levels of capabilities with new equipment that may be present in the network.

Since the watermark is not perceptible to a human, it does not significantly effect the performance of the multimedia signal to the end user, in legacy equipment. For example, a 20-bit signature, applied as a content capabilities watermark to non-critical bits in a compressed LPC-10e bitstream, appears to legacy LPC-10e equipment as a valid LPC-10e data message. The legacy equipment passes the bitstream to the appropriate decoding/uncompression unit and reconstructs the audio signal. Since the signature is applied only at periodic intervals, the end user of the legacy equipment will not perceive any degradation in the reconstructed voice signal. Upgraded, or new equipment, that uses a watermark detection process, can determine, based on the watermark, if the data stream is transmitted from new or legacy equipment, and can act accordingly to negotiate the highest level of capabilities possible.

If the destination equipment determines that the data stream is sent from upgraded equipment that supports a higher level of capabilities than the legacy equipment, it can begin negotiation processing to use the upgraded equipment's enhanced multimedia capabilities, rather than remaining in a degraded operational mode in which both the source and destination remain in the previously negotiated lower capability mode.

Since the detection and negotiation processes take place between the application and transport layers, it is transparent to the lower levels of data processing and is unaffected by further information transformation, including encryption, data packing, and data routing techniques. This means that the watermarked multimedia signal can be treated by routers, relay equipment, etc., as any other random data stream.

Although the content capabilities watermark is described here as embedded in voice data for use with communicating vocoders, the invention is not limited to use with voice signals. Rather, it applies to other types of data as well in which a signature can be embedded without unduly degrading the data, at least as that data is perceived by a user. For instance, the content capabilities watermark can also be embedded in image data, and used by devices that negotiate capabilities to communicate the image data. Examples of such devices that lend themselves to content watermarking include cellular telephones, pagers and other wireless devices, to indicate the status and interworking capabilities of these devices, personal digital assistants (PDA's), personal handheld audio devices such as Motion Picture Experts Group (MPEG) audio players, digital video disks (DVD's), compact disks (CD's), and other mass data storage devices.

Multimedia Authentication Watermarking Architecture

A block diagram of a multimedia authentication watermarking architecture is shown in FIG. 1, and includes a source processor 1 and a destination processor 6. The source processor 1 includes a multimedia application processor 2, a digital watermark signature generator 3, a combiner 4 and a transport/network processor 5.

The digital watermark signature generator 3 outputs a unique signature to the combiner 4. The multimedia application processor 2 receives a multimedia data stream such as a voice, video, or data stream, from an application program. The multimedia application processor 2 compresses, or otherwise transforms the multimedia data stream, and outputs a processed multimedia data stream to combiner 4.

The combiner 4 embeds the digital watermark signal into the multimedia data stream. For example, the watermark signal can be logically OR'd with the masked data stream at appropriate fields of the data stream, such as at certain bit positions, depending upon the application. These locations are chosen so that they have a minimal impact on the subjective quality at the destination of the multimedia data stream. The watermark can be applied on a periodic basis to facilitate the detection process and increase the probability of detection of the watermark. The combiner 4 then outputs a signed watermarked multimedia data stream to transport/network processor 5. The network/transport processor 5 applies the necessary message headers and control bits, and packetizes the data stream. Accordingly, transport/network processor 5 outputs a data packet, or data transmission unit, with network/transport headers applied to a data field that includes the digital watermark signature.

The destination processor 6 receives the data transmission unit sent by source processor 1. The destination processor includes a transport/network processor 7, a watermark detector 8, a watermark extraction mask unit 9, a multimedia application processor 10 and a capabilities negotiation processor 11. The transport/network processor 7 receives the data transmission unit, or packet, determines if it is destined for the destination processor 6, and if so removes the transport and network headers and outputs a processed data unit to the watermark detector 8. The watermark extraction mask unit 9 generates a predetermined watermark extraction mask corresponding to the watermark signature generated by the generator 3 in the source processor 1, and outputs that mask to watermark detector 8. Watermark detector 8 uses the mask to extract the watermarked source capabilities signature from the data unit. The detector 8 determines if a watermark is present in the data unit and if so, identifies the source by comparing a digital signature for the source with the multimedia bitstream watermark. If they match, that information along with the extracted watermark can be sent to the capabilities negotiation processor 11, which can track the occurrences of the watermark and negotiate capabilities. The watermark detector 8 outputs the data unit with the watermark removed to multimedia application processor 10 which performs any decompression or other transformation necessary to recover the multimedia data stream. Processor 10 then outputs the reproduced multimedia data stream, such as a voice, video, or data signal.

The capabilities negotiation processor 11 keeps track of the watermark occurrence history by maintaining a time/history record of those occurrences. The capabilities negotiation processor 11 takes appropriate action to automatically negotiate the destination processing based on capabilities information contained in the watermark. The capabilities negotiation processor can then determine the sources capabilities, and output a control/status signal indicating those abilities to a capabilities control unit to initiate the negotiation. The capabilities processor then uses the control/status information received from the source to configure its capabilities to match those of the sources to the highest common denominator. For instance, if the control/status signal indicates that the source has the ability to accept MELP or LPC-10e compressed speech, the capabilities processor configures itself to transmit MELP speech, since that speech protocol is the highest common speech processing protocol that both the source and destination can understand. Other types of capabilities can be negotiated using the techniques described here. For example, source and destination processors can configure themselves to select a highest capability common vocoder, common video compression techniques, etc.

Also, the source processor can embed in a watermark a group of capabilities, such as vocoder type (e.g., MELP, LPC-0e, etc.) and the type of handset the source is currently using (e.g., an H-250 handset, etc.). When a group of capabilities are embedded in a watermark, those capabilities can be negotiated individually or as a group. For example, if the destination processor knows that a certain handset needs additional low frequency gain to increase intelligibility, it can configure its audio equalizer to provide the necessary gain.

The capabilities negotiation processor 11 can determine when to negotiate to an improved capability, or fall back to legacy operational mode based on the time occurrences of the watermark. For instance, if the capabilities negotiator has not detected any legacy equipment transmissions for a pre-determined length of time, it can switch from a legacy operational mode to an improved operational mode. If the capabilities negotiator detects a legacy message, the destination processor can fall back into a legacy operational mode for compatibility with older, non-upgraded equipment.

Multimedia Authentication Watermarking Process

Figure 2:
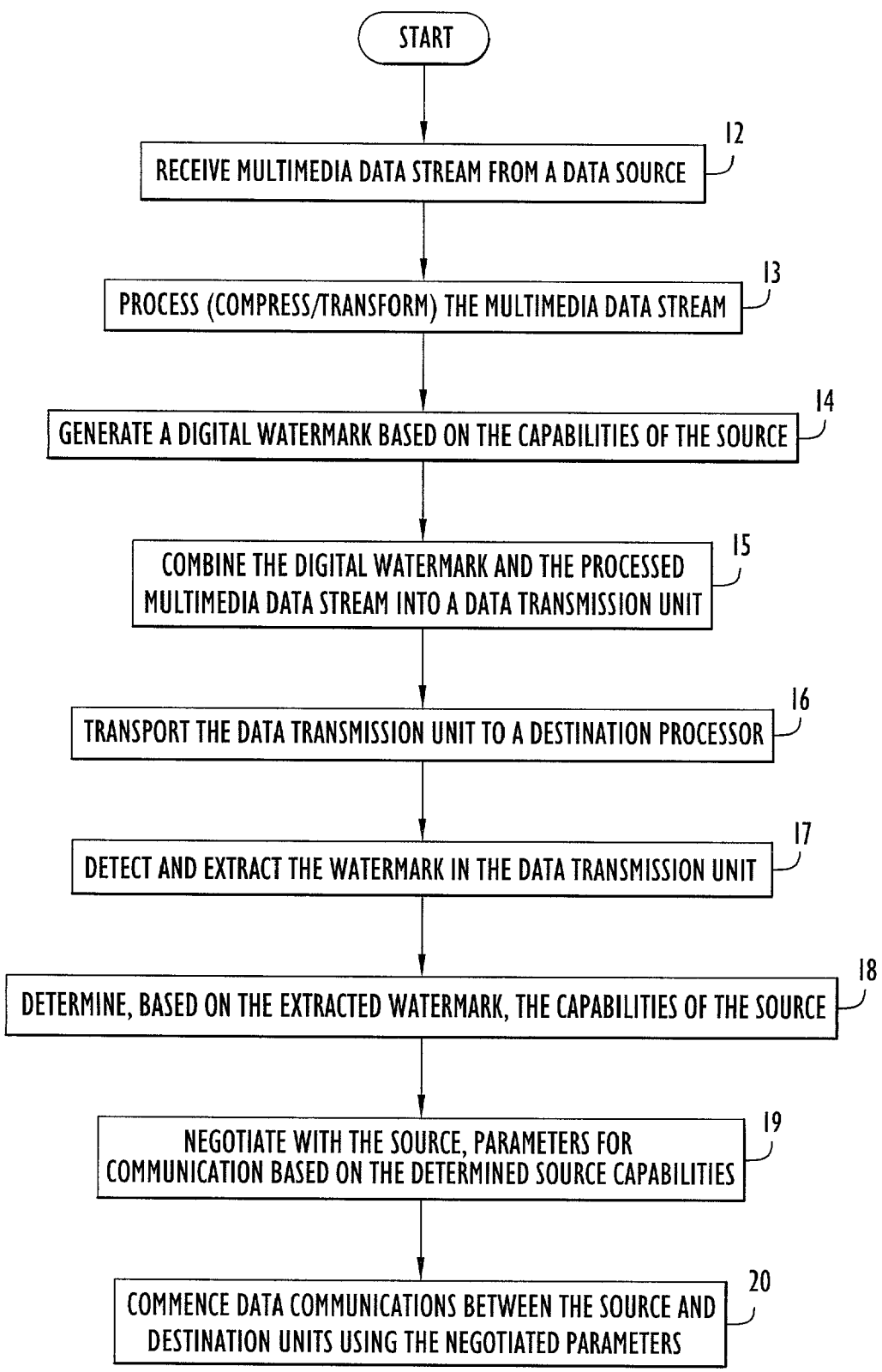
FIG. 2 is a flowchart illustrating a process for negotiating a set of communication capabilities.

A process for using the multimedia authentication watermarking system shown in FIG. 1, is illustrated in FIG. 2. The multimedia application processor 2 of source processor 1 receives a multimedia data stream, such as a voice, video or data stream from a data source (12), and processes that stream to compress or otherwise transform the data within the stream (13). The digital watermark signature generator 3 generates an appropriate watermark signature that includes information concerning the capabilities of the data source (14) for use in negotiations. The combiner 4 combines the generated watermark signature with the processed data stream output from the multimedia application processor 2, and outputs a signed data stream to a transport/network processor 5 (15). One way of combining the watermark signature with the processed data stream is to logically overwrite the data stream at the appropriate bit positions with the watermark signature, depending upon the application. Those bit positions are chosen so that they have a minimal impact on the subjective quality of the multimedia data stream at the destination. The watermark can be applied on a periodic basis to facilitate the detection process and increase the probability of detection of the watermark. The transport/network processor 5 adds the appropriate network and transport layer headers to the signed data stream and outputs it as a data transmission unit, such as a data packet (16). For example, in a TCP/IP network environment, the appropriate TCP/IP headers are added to the signed data packet to route the packet to the destination. Other types of networks, such as asynchronous transfer mode (ATM) networks, add headers to route information as appropriate. For instance, in a space-based network, a packet might be routed using a Proximity-1 link layer protocol. In that case, the Proximity-1 headers are needed to route the packets to the final destination.

The transport/network processor 7 of the destination processor 6 receives the data transmission unit, or data packet sent from source processor 1, and removes communication headers and control information from the packet (16). The watermark detector 8 detects whether the received data packet includes a watermark, and if so, extracts it (17). The watermark is analyzed to determine from it the capabilities of the source (18). Based on those determined capabilities, the destination negotiates with the source communication capabilities to utilized in subsequent communications (19). The subsequent communication is commenced using the negotiated parameters negotiated between the destination and source (20).

Figure 3:
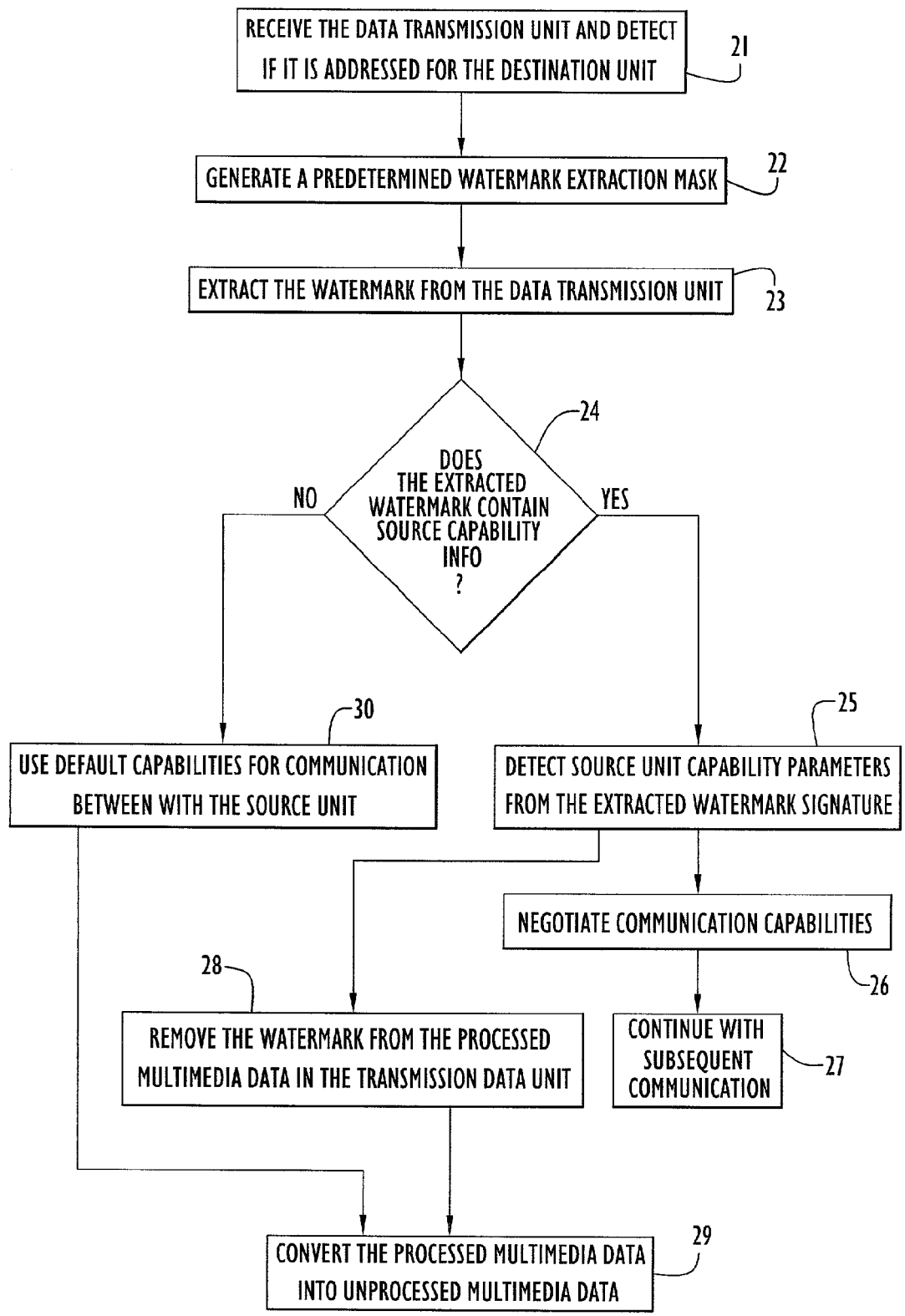
FIG. 3 is a flowchart illustrating a process for extracting a digital watermark containing information concerning a source's capabilities.

A more detailed illustration of the process for extracting a digital watermark containing information concerning a source's capabilities is shown in FIG. 3. Here, the data transmission unit is received at the destination processor which detects if it is addressed for the destination (21). Watermark generator 9 generates a predetermined watermark extraction mask (22). The received data transmission unit is analyzed to determine if a watermark is present. If so, the watermark is extracted (23). The watermark is examined to determine if it contains capability information about the source unit that transmitted the transmission unit (24). If the watermark contains source capability information the source unit's capability parameters are detected from the extracted watermark signature (25). The destination processor then negotiates communication capabilities with the source processor (26) and continues with subsequent communications (27). After extracting the capability parameters from the watermark signature the watermark is removed from the processed multimedia data in the transmission data unit (28). The processed data is again processed to decompress or otherwise inverse transform the data to recover the multimedia data stream (29) and output that recovered data stream to a destination application.

If the extracted watermark does not compare with the predetermined watermark generated by the destination watermark generator, then default, or fallback capabilities are used for communication with the source processor (30).

The watermark generated by the source can be either static or dynamic depending on whether the source capabilities change with time. For instance, prior to a software update, a particular source may only be capable of running LPC-10e. After the software is updated, it might have the capability to run other vocoders, such as a MELP vocoder. Also, the capabilities may be location dependent. If the source contains a GPS receiver, or other position determination device, it can change it's capabilities depending upon it's location.

It will be understood that the digital watermarking signature generator and the watermark detector can be embodied in software, hardware, or a combination of both technologies. The capabilities negotiation processor can keep track of the watermark occurrence history and take appropriate action to automatically negotiate the destination processing. The multimedia application processing converts the multimedia bitstream back to the audio/voice/video domain.

Wireless Radio System Application

Figure 4:
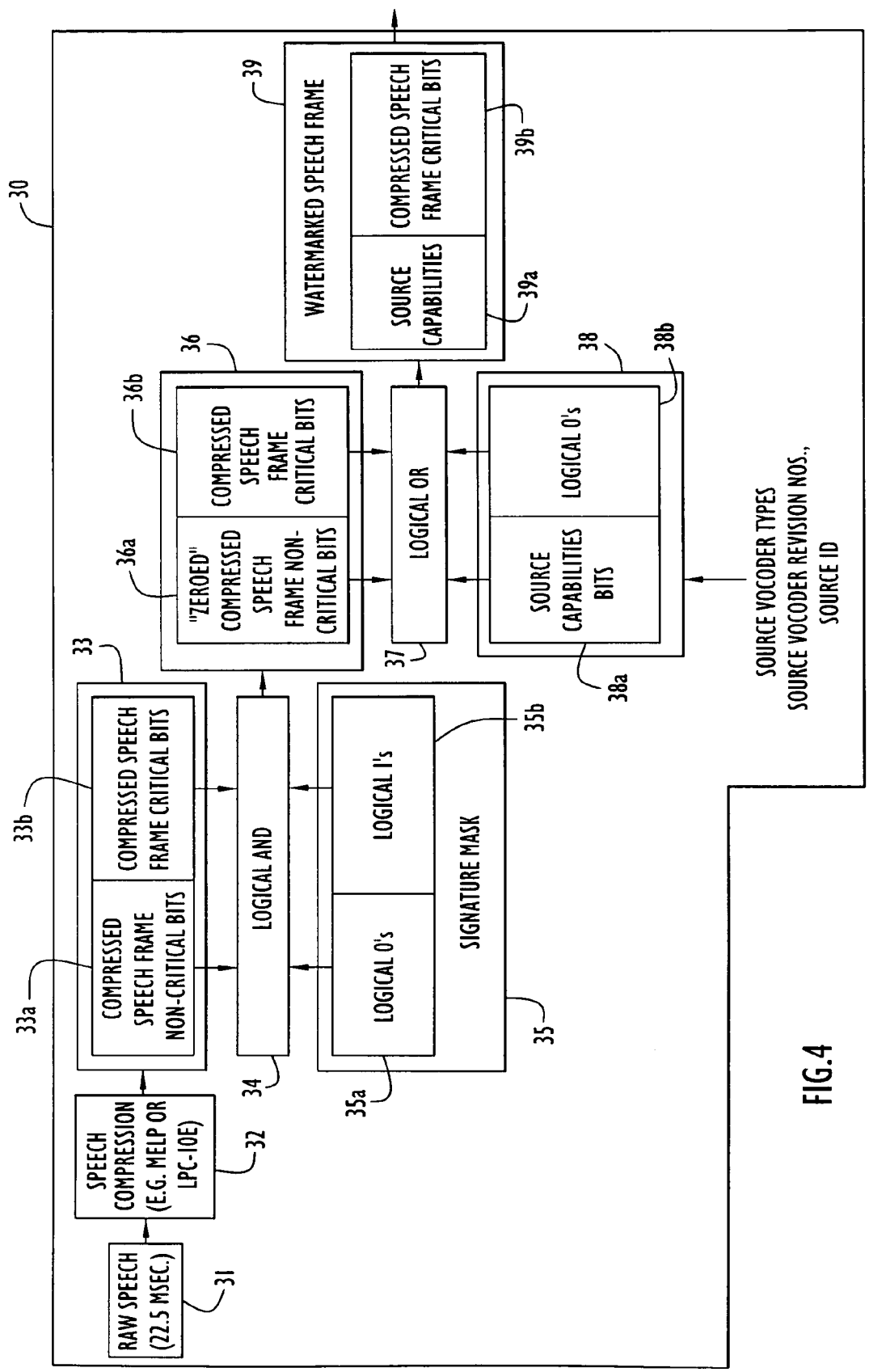
FIG. 4 is a block diagram of a wireless radio source unit that generates a watermarked speech frame that includes information concerning the capabilities of the radio.

An example of an application that uses digital watermarks for negotiating between the source and destination units shown in FIG. 1 is a wireless radio system used in a military environment. Wireless radios in such a system can use earlier, or legacy, vocoders such as an LPC-10e vocoder, or a newer, more capable vocoder such as a MELP vocoder. A block diagram of a wireless radio source unit 30 is shown in FIG. 4. The source radio includes a speech generation unit 31 that converts raw speech into a sampled signal that is sampled, for example, at a sampling interval of 22.5 milliseconds. The sampled raw speech is input to a speech compression unit 32 that compresses the speech according to either the MELP or the LPC-10e standards. The compressed speech is output and supplied to a first buffer 33 that distinguishes the critical bits 33*b* in the compressed speech from the non-critical bits 33*a*. The compressed speech frame is supplied to a logical AND circuit 34. Also supplied to the logical AND circuit is a signature mask output from a signature mask unit 35. The signature mask includes a set of logical zeros (0's) 35*a* and a set of logical ones (1's) 35*b* arranged with a priori knowledge of the watermark arrangement. The logical zeros 35*a* correspond to the positions of the non-critical bits in the compressed speech frame. Logically AND'ing the compressed speech frame bits with the signature mask results in a compressed speech frame with the non-critical bits set to zero and the critical bits retaining their value from the compressed speech frame.

The compressed speech frame output from logical AND circuit 34 is input to a second buffer 36. The compressed speech frame stored in buffer 36 includes a first storage area 36*a* that includes the compressed speech frame non-critical bits that have been set to zero 36*a* and the compressed speech frame critical bits 36*b* that make up the speech frame output from logical AND circuit 34. The speech frame stored in buffer 36 that includes the zero-value non-critical bits is applied to a logical OR circuit 37. Also applied to the logical OR circuit 37 are a set of source capability bits stored in a first area 38*a* of a source capabilities buffer 38. Stored in a second area 38*b* of buffer 38 is a set of logical zeros that correspond to the positions of the compressed speech frame critical bits in the speech frame. The source capability bits stored in area 38*a* are set according to source capability information concerning capabilities of the source radio. The capability information can include, for example, source vocoder types, source vocoder revision numbers, source ID, etc. The logical OR circuit 37 combines the source capabilities information from buffer 38 with the speech frame recorded in buffer 36. The effect of that operation is to combine the source capability information with the compressed speech frame non-critical bits. The resulting output of the logical OR circuit is output to a watermarked speech frame buffer 39 that contains a watermarked speech frame having a set of source capability bits 39*a* and a set of compressed speech frame critical bits 39*b*. Because the source capability bits are located in the non-critical bit positions of the compressed speech frame, applying the watermark has little noticeable effect on the speech frame. The watermark speech frame 39 is then output from the source unit 30 and transmitted to a destination radio.

Figure 5:
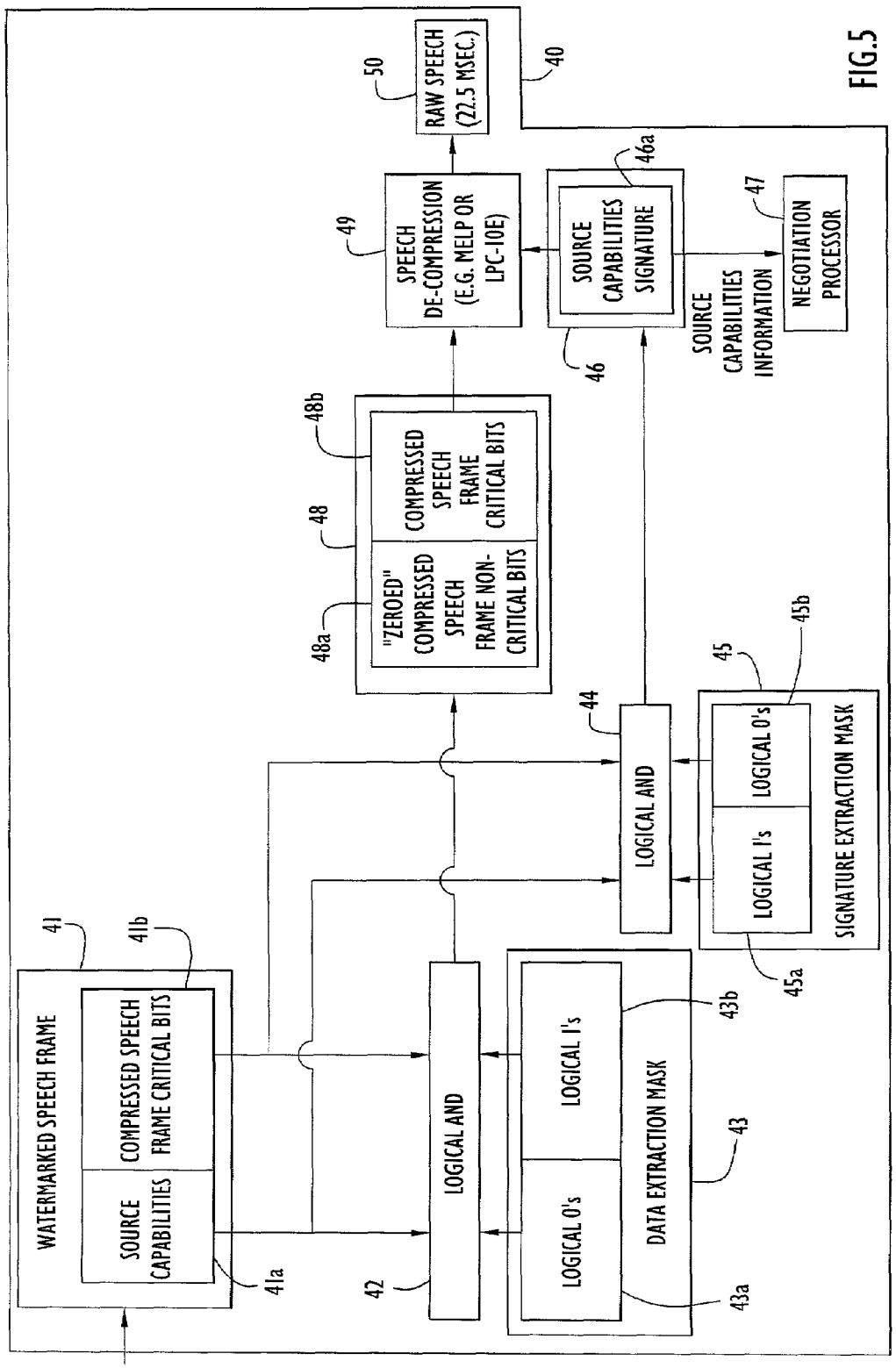
FIG. 5 is a block diagram of a wireless radio destination unit that receives and processes a watermarked speech frame that includes information concerning the capabilities of the wireless radio source unit shown in FIG. 4.

A destination radio 40 is shown in FIG. 5. The destination radio receives the watermark speech frame and stores it in a speech frame storage buffer 41. The received speech frame corresponds to the watermarked speech frame transmitted from source radio 30, and includes a set of source capability bits stored in a source capabilities area 41*a* and a set of compressed speech frame critical bits stored in a critical bit area 41*b*. The destination radio uses the watermark speech frame to extract the source capability information and to extract the speech information from the critical bit area for reproducing the speech. A first logical AND circuit 42 extracts the compressed speech frame critical bits from the watermarked speech frame. A data extraction mask, held in a data extraction mask buffer 43, includes a set of logical zeroes 43a at locations corresponding to locations of the source capabilities information within the watermarked speech frame, and a set of logical ones 43b at locations corresponding to locations of the compressed speech frame critical bits within the watermarked speech frame. The data extraction mask applies those logical zeroes and ones to the logical AND circuit 42 which operates to output the compressed speech frame with the non-critical bits set to zero. Applying the logical ones 43b to the watermark speech frame causes the compressed speech frame critical bits to be output from the logical AND circuit 42 unaltered.

The watermark speech frame 41 is also applied to a second logical AND circuit 44. Also applied to logical AND circuit 44 is a signature extraction mask held in signature extraction buffer 45, which also includes an area 45a for storing logical ones and an area 45b for storing logical zeros. As with the data extraction mask described above, the logical AND circuit 44 applies the signature extraction mask 45 to the watermarked speech frame, although it outputs the source capability bits 41a unaltered and sets the critical bits 41b to zero. That is, the logical AND circuit 44 applies the logical ones in area 45a to the source capability bits 41a in the watermarked speech frame and allows those source capability bits to pass unaltered. However, the logical AND circuit 44 applies the logical zeroes in area 45b to the compressed speech frame critical bits 41b of the watermark speech frame, thereby setting those critical bits to zero. Hence, logical AND circuit 44 outputs source capability bits 41a with the compressed speech frame critical bits 41b set to zero.

The source capability information output from logical AND circuit 44 is stored in a source capabilities signature unit 46 which includes a source capability signature area 46a. Unit 46 can also include an area for storing the critical bits that were set to zero by logical AND circuit 44, although those bits need not be retained. The source capabilities unit 46 decodes the source capabilities signature, and from that signature determines the source radio's capabilities and outputs information to that effect. The source capabilities information can include, for example, the vocoder-type, vocoder revision number, ID, etc. of the source radio. This capability information is supplied to a negotiations processor 47 that negotiates communications, or other parameters with the source radio. The negotiations processor 47 uses the source capabilities information to determine the common capabilities between the source and the destination radios based on the source capability signature and the capabilities information supplied by the destination radio. The source capabilities unit 46 determines the highest level of source capability commonality between the source and destination radios and uses that information to negotiate with the source radio.

A compressed speech buffer 48 stores the compressed speech frame non-critical bits set to zero 48a and the compressed speech frame critical bits 48b. The speech frame in buffer 48 is passed to a speech decompression unit 49. The speech decompression unit receives from the source capabilities unit 46 capability information designating decompression parameters, such as the type of decompression to perform (e.g., MELP or LPC-10e). The speech decompression unit 49 uses that information for setting parameters for the speech decompression. The speech decompression unit 49 operates to decompress the speech frame based on the decompression parameters supplied from source capabilities unit 46, and outputs the raw speech signal 50, again at the sampling rate of 22.5 milliseconds.

In this manner the destination radio 40 can operate with the highest level of capabilities that are in common with the source radio in order to communicate with the source radio and to process the speech signal.

Figure 6A:
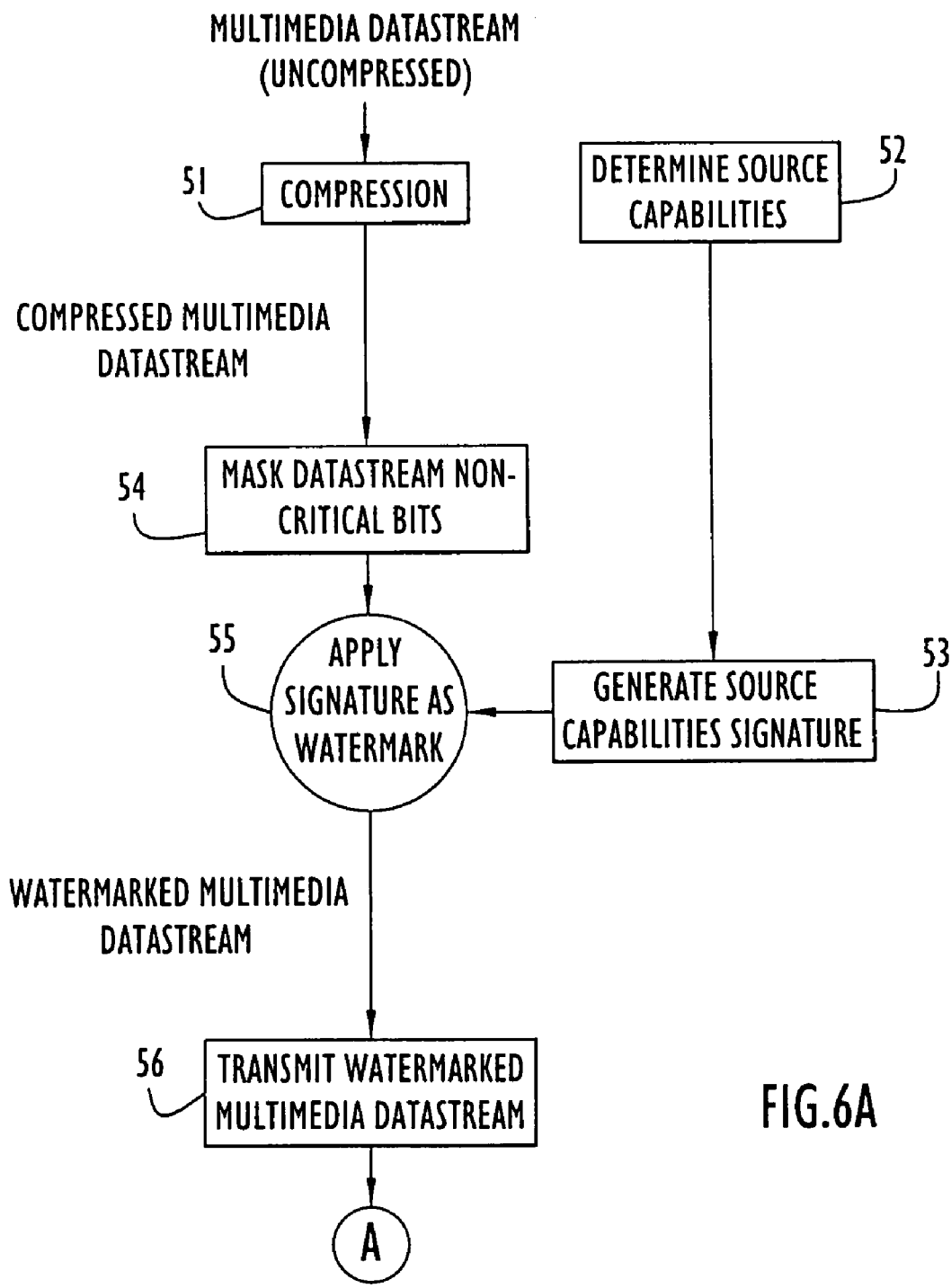
FIG. 6A is a diagram illustrating an operational process of the wireless radio source unit shown in FIG. 4.
Figure 6B:
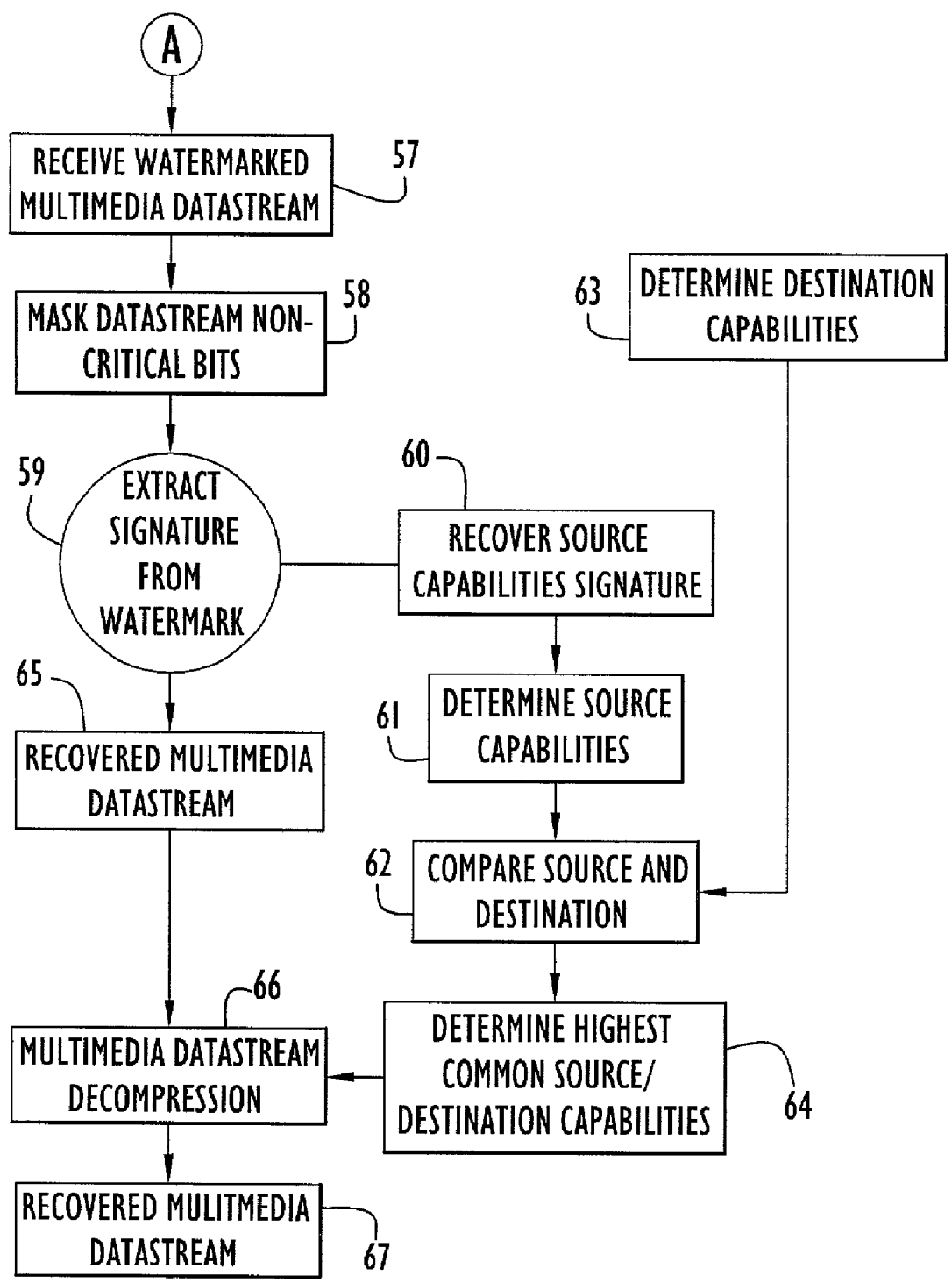
FIG. 6B is a diagram illustrating an operational process of the wireless radio destination unit shown in FIG. 5.

A process for operating the wireless radios shown in FIGS. 4 and 5 is illustrated in the flowcharts shown in FIGS. 6A and 6B. FIG. 6A illustrates the operations performed by the source wireless radio 30 in FIG. 4. Here, an uncompressed multimedia data stream is compressed 51 using a compression algorithm available to the source radio. Capabilities of the source unit 52 are determined and that capability information is used to generate a source capabilities signature 53. The compressed multimedia data stream signal is applied to a signature mask that masks the data stream non-critical bits for use in carrying the source capabilities information 54. The generated source capabilities signature is then applied as a watermark to the masked and compressed multimedia data stream 55. The watermarked multimedia data stream is then transmitted to a destination wireless radio 56. The transmission is shown by way of connector A in FIG. 6A connecting to a similar point in FIG. 6B.

The destination wireless radio receives the watermarked multimedia data stream 57, masks the datastream non-critical bits 58, and extracts a signature from the watermark 59. The extracted signature is used to recover the source capabilities signature from the data stream 60. The source capabilities are determined from the recovered source capabilities signature 61. Those source capabilities are compared 62 with capabilities of the destination radio 63. Based on the compared source and destination capabilities, the highest level of capabilities common to both the source and destination are determined 64 and capabilities information consistent with that determination is output for use in decompression and subsequent communication with the source radio.

Once the signature is extracted from the watermark in operation 59, the data stream is then recovered 65. The multimedia data stream is then decompressed using the determined common source and destination capabilities 66. Upon the decompression, the multimedia data stream is recovered 67 and available for speech reproduction.

Although watermarks are described above in terms of communicating a plurality of attributes, alternatively, if desired, a single attribute only can be embedded in the multimedia data as a watermark for use in configuring a destination radio. For example, the single attribute embedded as a watermark can be an indication that the source radio compressed the speech signal according to the MELP standard.

APPLICATIONS

The systems and methods described here can be applied to many applications, including, but not limited to the following applications.

Military mobile, wireless communication equipment, including radios, secure terminals.

Multimedia over IP equipment including voice, video and data communications equipment.

Mobile networking multimedia equipment, including cell-phones, networked radios, network data and video terminals, PDA's, Digital Paging, Advanced HDTV.

Point-to-Point, broadcast, multicast, and conferencing multimedia equipment.

Non-wireless communication equipment, including internet, intranet and point-to-point where known ID, location or user capabilities is important.

The methods, systems and apparatuses described here can be used whenever two devices must communicate and offer varying service, accommodate different versions or provide flexible interfacing. For example, in a mobile client/server environment these techniques can be used to synchronize varying versions of the clients with the server's resources. For instance, a PDA client might use the digital watermarking techniques described here to authenticate its ability to use a particular feature, allow for conversion of data or provide upgraded services. Newer PDAs with more capable software can gain access to better services/features than can older PDAs that do not have the more capable software. The digital watermarking techniques described here also can be used with other devices, such as cellular telephones to identify the telephone's ability to receive pages or e-mails. An example of such a use with telephones is where two telephones use the same telephone number. During a negotiation process the telephones inform a base station of the services the telephones are capable of providing. One telephone might allow a particular service because that telephone is a newer model that supports newer features. However, another telephone might be an older telephone that is incapable of the supporting newer features. Accordingly, each telephone informs the base station of its capabilities by using a digital watermark with information concerning the telephone's capabilities included in the watermark. The base station negotiates with each telephone individually, based on that telephone's capabilities indicated in the watermark, thereby allowing each telephone to use the features it has available and to operate with the highest level of capabilities that the telephone can support.

Having described systems and methods for using a digital watermark to negotiate compatible capabilities, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method for communication between a first device and a second device, comprising:
    at the first device:
        generating signature information concerning capabilities and/or attributes of the first device and changing the signature information from time to time according to changes in the capabilities and/or attributes of the first device;
        inserting said signature information as a digital watermark within a multimedia data stream after application layer processing of the multimedia data stream but prior to network and transport layer processing that applies transport layer headers to the data stream, so as to produce a transmit data stream with the digital watermark comprising the signature information embedded therein but not in the transport layer headers of the data stream so that the digital watermark may be dynamic in continuous communication of the multimedia data stream; and
        transmitting the transmit data stream to the second device; at the second device:
        receiving the transmit data stream from the first device;
        extracting said digital watermark comprising the signature information from the transmit data stream to determine the capabilities and/or attributes of the first device; and
        configuring capabilities of the second device based on the capabilities and/or attributes of the first device; and
        processing data stream frames received from the first device based on the capabilities configured for the second device.

2. The method of claim 1, wherein said signature information concerning the capabilities of the first device comprises one of a type of voice operated recorder (vocoder), a device revision indicator, and a device identifier.

3. The method of claim 1, wherein at the first device, further comprising compressing the data stream according to a source compression algorithm, wherein said signature information identifies the source compression algorithm.

4. The method of claim 1, wherein at the first device, said generating further comprises:
    compressing the data stream to generate a compressed data stream;
    detecting a capability of the first device;
    generating the signature information based on the detected capability of the first device; and
    applying the digital watermark to the compressed data stream.

5. The method of claim 4, wherein detecting comprises detecting a capability of the first device comprising at least one of a type of voice operated recorder (vocoder), device revision indicator, and a device identifier.

6. The method of claim 4, wherein the data stream includes multimedia data encoded in a plurality of fields including non-critical fields and critical fields, and wherein said inserting comprises masking the non-critical fields of the data stream and inserting the signature information to the masked fields of the data stream; and outputting a signed data stream having the non-critical fields of the data stream containing the signature information and the critical fields of the data stream containing the multimedia data.

7. The method of claim 1, wherein the data stream includes header information and multimedia content information, and wherein said digital watermark is contained in the multimedia content information.

8. The method of claim 1, wherein at the second device, further comprising: comparing the capabilities and/or attributes of the first device with the capabilities and/or attributes of the second device.

9. The method of claim 8, wherein at the second device, further comprising selecting a capability and/or attribute that is common to both the first device and the second device based on said comparing.

10. The method of claim 9, wherein at the second device, further comprising recovering said data stream based on the capability and/or attribute that is determined to be in common to both the first device and second device.

11. The method of claim 1, wherein said inserting comprises substituting a plurality of bits representing said signature information for the least significant bits of linear prediction compression coefficients associated with audio content contained in said multimedia data stream.

12. The method of claim 1, wherein said inserting comprises substituting a plurality of bits representing said signature information for: a jitter index, the least significant bits of a gain index, the least significant bits of Fourier Magnitudes; or the least significant bits of reflection bits, associated with a compression technique for audio content contained in said multimedia data stream.

13. The method of claim 1, wherein said inserting comprises substituting a plurality of bits representing said signature information for the least significant bits of unrestricted motion vectors and Discrete Cosine Transform (DCT) coefficients associated with motion video content contained in said multimedia data stream.

14. The method of claim 1, wherein said inserting comprises substituting a plurality of bits representing said signature information for the least significant bits of the quantized Discrete Cosine Transform (DCT) coefficients associated with still images contained in said multimedia data stream.

15. The method of claim 1, wherein said inserting comprises logically OR'ing said signature information with the multimedia data stream at bit positions of the multimedia data stream chosen to have minimal impact on quality of the multimedia data stream at the second device.

16. The method of claim 1, wherein at the second device, configuring comprises configuring capabilities of the second device to match the capabilities and/or attributes of the first device to a highest common denominator of capabilities between the first device and the second device.

17. The method of claim 1, wherein at the first device, said inserting comprises inserting the signature information as a digital signal in non-critical points in the data stream so that the signature information is imperceptible to a human when the data stream is decoded at the second device.

18. The method of claim 1, wherein the capabilities and/or attributes of the first device are dependent on a location of the first device, and wherein said generating signature information comprises generating signature information dependent on the location of the first device.

19. A communication system comprising:
a first communication device that comprises:
a data stream processor that outputs a data stream to be transmitted;
a signature generator that generates signature information concerning at least one capability and/or attribute of the first communication device and changes the signature information from time to time according to changes in the capabilities and/or attributes of the first communication device;
a combiner that embeds the signature information as a digital watermark within the data stream after application layer processing of the data stream but prior to network and transport layer processing wherein the digital watermark comprising the signature information does not reside in the transport headers of the data stream so that the digital watermark may be dynamic in continuous communication of the multimedia data stream; and
a transport processor that generates a transmit data stream comprising the data stream with the embedded signature information embedded therein for transmission;
a second communication device that comprises:
a transport processor unit that receives the transmit data stream from the first communication device;
a detector that detects the digital watermark comprising the signature information embedded in the transmit data stream; and
a capabilities processor that extracts the signature information to determine the capabilities and/or attributes of the first communication device in order to configure capabilities of the second communication device based on the capabilities and/or attributes of the first communication device.

20. The communication system of claim 19, wherein said signature generator in the first communication device generates said signature information comprising at least one of a type of voice operated recorder (vocoder), device revision indicator, and a device identifier.

21. The communication system of claim 19, wherein said first communication device further comprises a compression unit that compresses the data stream according to a source compression algorithm, wherein said signature information also identifies the source compression algorithm.

22. The communication system of claim 19, wherein said transport processor in the first communication device adds communication protocol information to the signature information.

23. The communication system of claim 19, wherein the combiner in the first communication device comprises a circuit for logically combining the signature information with the data stream.

24. The communication system of claim 19, wherein said second communication device comprises a multimedia data decompression unit configured based on said signature information identifying said compression algorithm to decompress the multimedia data stream.

25. The communication system of claim 19, wherein the detector in the second communication device comprises an extraction mask unit configured to logically combine the multimedia data containing the signature information with a data extraction mask and a signature extraction mask, and to output a multimedia data frame and a signature signal containing the signature information concerning at least one communication capability of the first communication device.

26. The system of claim 19, wherein said combiner of the first communication device logically OR's said signature information with the data stream at bit positions of the data stream chosen to have minimal impact on quality of the data stream at the second communication device.

27. The system of claim 19, wherein the capabilities processor of the second communication device configures capabilities of the second communication device to match the capabilities and/or attributes of the first communication device to a highest common denominator of capabilities between the first communication device and the second communication device.

28. A method for communication between a first device and a second device, comprising:
at the first device:
generating signature information concerning the capabilities of the first device, and changing the signature information from time to time with changes in the capabilities of the first device;
inserting said signature information as a digital watermark within a multimedia data stream but not in header fields associated with the multimedia data stream so that the digital watermark may be dynamic in continuous communication of the multimedia data stream;
applying transport layer header fields to the multimedia data stream; and
transmitting the multimedia data stream with the signature information embedded therein;
at the second device:
receiving the multimedia data stream transmitted from the first device;
extracting said digital watermark comprising the signature information from within the multimedia data stream received from the first device;
determine the capabilities of the first device based on said signature information;
configuring the capabilities of the second device based on the capabilities determined for the first device from said signature information.

29. The method of claim 28, and farther comprising, at the second device, processing the multimedia data stream received from the first device based on the capabilities configured for the second device.

* * * * *